(12) United States Patent
Sharad et al.

(10) Patent No.: US 12,539,932 B2
(45) Date of Patent: Feb. 3, 2026

(54) BALANCING SUPPORT SYSTEM FOR A SADDLE-RIDE TYPE MOTOR VEHICLE

(71) Applicant: TVS MOTOR COMPANY LIMITED, Chennai (IN)

(72) Inventors: Singhania Sharad, Chennai (IN); Venkata Manga Raju Karanam, Chennai (IN)

(73) Assignee: TVS Motor Company Limited, Chennai (IN)

( * ) Notice: Subject to any disclaimer, the term of this patent is extended or adjusted under 35 U.S.C. 154(b) by 398 days.

(21) Appl. No.: 18/004,180

(22) PCT Filed: Oct. 29, 2020

(86) PCT No.: PCT/IN2020/050913
§ 371 (c)(1),
(2) Date: Jan. 4, 2023

(87) PCT Pub. No.: WO2022/018740
PCT Pub. Date: Jan. 27, 2022

(65) Prior Publication Data
US 2023/0192221 A1    Jun. 22, 2023

(30) Foreign Application Priority Data
Jul. 18, 2020    (IN) .............................. 202041030741

(51) Int. Cl.
*B62J 45/413*    (2020.01)
*B62J 45/411*    (2020.01)
(Continued)

(52) U.S. Cl.
CPC ........... *B62J 45/413* (2020.02); *B62J 45/411* (2020.02); *B62J 45/422* (2020.02); *B62K 11/14* (2013.01); *B62K 2202/00* (2013.01)

(58) Field of Classification Search
CPC ..................................................... B62J 45/413
See application file for complete search history.

(56) References Cited

U.S. PATENT DOCUMENTS

| 8,606,464 B2 * | 12/2013 | Suzuki | B62K 21/00 |
| | | | 180/219 |
| 9,330,061 B2 * | 5/2016 | Koukes | G06F 17/00 |

(Continued)

FOREIGN PATENT DOCUMENTS

| EP | 3508409 A1 | 7/2019 |
| JP | 2005-349927 A | 12/2005 |

OTHER PUBLICATIONS

International Search Report issued in corresponding International Patent Application No. PCT/IN2020/050913 issued May 18, 2021 (5 pages).

(Continued)

*Primary Examiner* — Eric S. McCall
(74) *Attorney, Agent, or Firm* — Osha Bergman Watanabe & Burton LLP (57) ABSTRACT

A balancing support system is for a saddle ride-type motor vehicle that includes a frame assembly including a head tube in a front portion of the frame assembly, is configured to assist a rider by balancing the motor vehicle, and includes: a steering shaft rotatably journaled about the head tube; a plurality of sensors that senses various dynamic parameters of the motor vehicle and includes a steering angle sensor; an actuator unit secured to a first portion of the frame assembly; a torque enhancer unit configured to provide a driving force from the actuator unit to the steering shaft and disposed above the head tube; and a balancing support-control unit that estimates an estimated steering angle based on inputs received from the plurality of sensors, compares the estimated steering angle with an actual steering angle, and triggers the actuator unit.

18 Claims, 5 Drawing Sheets

(51) Int. Cl.
*B62J 45/422* (2020.01)
*B62K 11/14* (2006.01)

(56) References Cited

U.S. PATENT DOCUMENTS

| | | | | |
|---|---|---|---|---|
| 2009/0043443 | A1* | 2/2009 | Wei | B62D 15/024 |
| | | | | 701/31.4 |
| 2013/0057016 | A1* | 3/2013 | Yamada | B62J 17/02 |
| | | | | 296/78.1 |
| 2017/0240203 | A1* | 8/2017 | Klews | B62J 45/414 |
| 2020/0102043 | A1 | 4/2020 | Zhang et al. | |
| 2022/0177069 | A1* | 6/2022 | Sharad | G05D 1/0891 |
| 2023/0264685 | A1* | 8/2023 | Anandhu | B62J 45/415 |
| | | | | 701/36 |
| 2024/0182107 | A1* | 6/2024 | Gatten | B62D 6/002 |

OTHER PUBLICATIONS

Written Opinion issued in corresponding International Patent Application No. PCT/IN2020/050913 issued May 18, 2021 (13 pages).

\* cited by examiner

Fig. 3

BALANCING SUPPORT SYSTEM FOR A SADDLE-RIDE TYPE MOTOR VEHICLE

TECHNICAL FIELD

The present subject matter relates to a saddle type vehicle and more particularly to a balancing support system and a method for a saddle ride-type motor vehicle.

BACKGROUND

The present day four-wheeled vehicle have by large attained a level-1 autonomy, where the vehicles can perform one autonomous task at a time. These four-wheeled vehicle like cars mostly incorporate autonomous safety-oriented features, such as automatic lane keeping or adaptive cruise control. In some other advanced four-wheeled vehicle, with a level 2 autonomy, the vehicles can perform two autonomous tasks at a time, for example, a car can steer as well as perform lane-keeping, or auto-brake and operate adaptive cruise control. Thus, the four-wheeled vehicles are implementing these electric powers assisted systems (EPAS), and electronic stability programs (ESP).

However, there is still major gap in these areas when considering the two- or three-wheeled motor vehicles, which are typically saddle-ride type vehicles. One key area of focus towards providing a certain level of assistance to riders, is to provide stability when riding at low-speeds. Unlike four-wheeled vehicles, or vehicles with more than four-wheels, the saddle-ride type vehicles are unstable and have the tendency to roll over or capsize towards one lateral side. The saddle ride-type vehicles including two- and three-wheeled vehicles are steered by operating a handle bar in order to operate a front wheel. The rider has to exert high steering forces in order to maneuver the motor vehicle. For example, in slow moving traffic conditions, the rider is typically forced to ride at very slow speeds. In such conditions, it becomes extremely difficult for a rider to balance the vehicle as the vehicle has inherent poor stability at very low speeds.

BRIEF DESCRIPTION OF DRAWINGS

The detailed description is described with reference to the accompanying figures, which is related to a two-wheeled motor vehicle being one embodiment of the present invention. However, the preset invention is not limited to the depicted embodiment(s). In the figures, the same or similar numbers are used throughout to reference features and components.

FIG. 2 (a) depicts a steering support system supported by a frame assembly of a motor vehicle, in accordance with an embodiment of the present subject matter.

FIG. 2 (b) illustrates a schematic top view of a torque enhancer unit, in accordance with an embodiment of the present subject matter.

FIG. 2 (c) illustrates a schematic exploded view of a torque enhancer unit, in accordance with an embodiment of the present subject matter.

DETAILED DESCRIPTION

In the conventional two- and some three-wheeled vehicles, the rider has to continuously and consciously perform maneuvering operation to maintain stability and to avoid fall. It is even more challenging for a novice rider to avoid capsize. Unless for an experienced rider, the amount of steering torque and steering angle to be applied cannot be gauged by the novice rider. Even for the experienced rider such continuous and conscious maneuvering creates fatigue especially in traffic conditions. Thus, the rider of the saddle ride-type vehicles, finds it difficult to balance the vehicle while operating at low-speeds.

In order to address the problem related to assisting rider of the saddle-ride type motor vehicle, certain motor vehicle as per known art is provided with a simple assist function with a complex assembly. For example, a force transmitting system is provided with multiple linkages that occupies lot of space near compact handlebar assembly. Moreover, major portion of the force transmitting system is disposed at a large offset from the lateral center of the motor vehicle, which may create imbalance. In addition, the system disposed at an offset uses a link member or a rod for connecting with the steering system for assisting. The number of parts and joints are high is such systems. With higher number of joints, the manufacturing, assembly and maintenance gets complicated. Moreover, in these systems, depending on the direction of rotation of the steering system like the handle bar, a motor assists the rider in steering in the direction the rider tries to rotate to reduce effort. However, these systems do not provide stability or do not avoid fall of the motor vehicle, as the system goes by the input from the user and assists steering in the same direction. So, the system provides assistance even when the rider tends to maneuver in an undesired direction (in terms of stability). This may reduce fatigue experienced by the rider but it does not provide stability to the motor vehicle and hence, the motor vehicle is still prone to fall due to instability.

Certain attempts were made in the art to address the short coming of stability. However, these solutions are conceptual in nature and tend to modify the existing configuration of a motor vehicle. Such systems are difficult to adapt into mass produced saddle-ride type vehicles. The basic design language of a saddle-ride type motor vehicle itself is deviated from. For example, in an attempt to provide the steering assist, the solution proposes elimination of a conventional head tube. The head tube is replaced with a steering device that has two motors. Such solutions are typically implemented in large touring type motor vehicle, which have large volumes and layout space at the front. The challenge to implement such designs in a conventional and compact vehicle system is, the conventional frame structure will need modification and large space has to be created in the vicinity of the steering systems, which creates deviation from the standard saddle-ride motor vehicle design. Moreover, redesign of various systems in the motor vehicles takes time and involves huge design cost. Also, use of two motors for actuation significantly increases weight and cost of the system. Moreover, in order to support such large steering device at a front end of the vehicle requires lot of reinforcement at the front portion. At a time when entire automotive sector is typically moving towards weight reduction and improving efficiency, such weight addition design is undesired.

Moreover, some solutions propose modifying steering ratio between the input shaft and steering shaft, which may create confusion in mind of the rider as the motor vehicle responds differently at different conditions (steering ratio), which makes the driving unpredictable. Ease of mind during driving is one major challenge in such systems.

Some other solutions in the art suggest disconnecting the handle bar during steering assist. This requires special trainings for the riders to adapt to as it unconventional. Moreover, certain motor vehicles tend to switch between positive trail and negative trail during steering assist and to provide balance. For each of trail of the steering system, the user experiences a different driving posture as it may change handle bar position, effective seat height, wheelbase etc. This creates major discomfort to the rider and is not practically preferred. In some other solutions, and additional degree of rotation (when compared to conventional saddle ride-type motor vehicle) is created for the power unit to rotate with respect to a head tube. This requires changing the complete motor vehicle layout and requires a largely reinforced front structure that supports the front wheel and also, rotatably supports the power unit along with the rear wheel.

Thus, there exists a need for providing a compact and simple steering assist system that provides balance and stability. The steering assist system should be capable of being accommodated into an existing configuration of a saddle ride-type motor vehicle without the need for major changes.

Hence, the present subject matter provides a compact balancing support system for a saddle ride-type motor vehicle. The balancing support system for the saddle ride-type vehicle is configured to assists a rider, especially for balancing the motor vehicle even at low-speeds thereby providing certain level of autonomy.

The motor vehicle comprises a frame assembly. The frame assembly comprises a head tube disposed in a front portion thereof and a main tube extending rearward. The present invention enables use of a conventional frame assembly with minimal or no modifications. Thus, the conventional design language of a motor vehicle is retained.

A steering shaft is rotatably journaled about the head tube. The steering shaft is connected to front wheel through a standard front suspension system. No additional suspension system is required to disposed at the front portion of the motor vehicle for the balancing support system.

The motor vehicle is provided with a plurality of sensors for sensing various dynamic parameters of the motor vehicle. The plurality of the sensors comprising a steering angle sensor, which is critical for understanding the maneuvering state of the motor vehicle.

In one embodiment, one or more of the plurality of sensors are disposed in a posterior region of the motor vehicle. In one implementation, the one or more sensors are supported by one or more rear tube members of the motor vehicle. This enables the sensors to provide roll, yaw and other information with accuracy with minimal disturbance.

An actuator unit is secured to a first portion of the frame assembly. The present invention requires a small capacity actuator unit like a small capacity motor, which can be compactly accommodated on the motor vehicle. As per an embodiment, the actuator is disposed at the front portion of the motor vehicle which enables mass centralization and thereby further augments the stability of the vehicle.

A torque enhancer unit is provided for driving the steering shaft in order to provide balancing steering angle and corresponding torque to the rider. The torque enhancer unit is disposed compactly above the head tube without creating any interference with the actuator. The steering angle sensor is capable of functioning in conjunction with the torque enhancer unit to identify the steering angle. This eliminates the need for disposing the steering angle sensor in direct contact with the steering shaft or handlebar assembly, which may warrant change in mounting compromising on structural integrity as well as compact layout. The steering system including the steering shaft is a critical structure that receives loads and supports the front wheel and also, enables maneuvering therefore any modification in its design can lead to an undesirable trade-off on the structural strength of the system. The torque enhancer unit and the actuator unit are independently serviceable.

A balancing support-control unit of the balancing support system is provided for estimating an estimated steering angle based on inputs received from the plurality of sensors. The balancing support-control unit compares the estimated steering angle with an actual steering angle and, then determines a balancing steering angle to be provided to the steering shaft through the actuator unit. The balancing support-control unit actuates or triggers the actuator unit with an input corresponding to the balancing steering angle.

In one embodiment, the torque enhancer unit is disposed above the head tube. The torque enhancer unit is disposed such that it at least partially overlaps with the head tube when viewed along a steering axis, wherein the head tube is disposed at a lateral center of the motor vehicle. The torque enhancer unit disposed above the head tube can be enclosed by a panel assembly (say a front cover and a leg shield) thereby protecting it thereat. Further, the torque enhancer unit that overlaps with the head tube (in top view) occupies minimal space around the head tube thereby avoiding any change in front structure of the motor vehicle and enabling a compact vehicle design.

In one embodiment, the torque enhancer unit is configured to enhance the input from the actuator unit. In one implementation, the torque enhancer unit comprises a drive gear and a driven gear that are securely supported in a casing thereof.

The drive gear is functionally coupled to the actuator unit to receive driving input and the driven gear is functionally coupled to the steering shaft to drive it. The drive gear and the driven gear are configured with a gear ratio to provide torque enhancement to drive the steering shaft even by utilizing a small capacity actuator. In one embodiment, the handlebar assembly is also connected to the steering shaft through the torque enhancer unit. The handlebar assembly and the actuator unit are capable of parallelly providing input to the steering shaft.

In one embodiment, the torque enhancer unit comprises a tandem gear, which is functionally coupled to the drive gear to rotate therewith. In one implementation, the tandem gear and the driven gear are integrally formed to make it a compact assembly. The steering angle sensor is functionally coupled to the tandem gear and is configured to provide steering angle information.

In one implementation, the tandem gear is coupled to a sensor gear that is rotatably supported in the torque enhancer unit. The sensor gear can interface with a steering angle sensor to provide information related to steering condition.

In one embodiment, the steering angle sensor is disposed substantially between a first plane passing along an upper surface of said torque enhancer unit and a second plane passing along an upper surface of the actuator unit. Thus, the critical steering angle sensor is securely accommodated between the torque converter unit the actuator unit.

In one embodiment, the torque enhancer unit is disposed substantially within a laterally central region of the motor vehicle. Thus, the torque enhancer unit and the actuator unit, even though adding weight to the motor vehicle, are disposed in a balanced and compact manner within the central region thereby eliminating any shift in center of gravity towards sides, which is critical for balancing and stability of the vehicle.

In one embodiment, a first portion of the frame assembly is formed by the head tube and a front portion of a main tube. The actuator unit as per the present invention can be compactly accommodated on the frame assembly irrespective of the configuration of the motor vehicle i.e. a scooter type vehicle with step-through space & swinging type power unit or a motorcycle type vehicle with fuel tank disposed rearward of the head tube or a three-wheeled vehicle.

In one embodiment, the actuator unit is coupled to a rearward facing portion of the head tube, wherein the main tube is extending rearwardly downward. With such configuration the utility space, like the step-through space, is not compromised. As the actuator unit is disposed to extend beyond the head tube away from the step-through space and to be coupled to the torque converter unit disposed above the head tube. The torque converter is securely accommodated between the handlebar assembly and the head tube In one embodiment, the plurality of sensors comprises a velocity sensor, a global positioning unit, a steering torque sensor and an inertia measuring unit for providing information related to various dynamic parameters of the vehicle like speed/velocity, yaw, roll, pitch angle etc. The plurality of sensors is being supported by the frame assembly of the motor vehicle. The plurality of sensors is communicatively coupled to the balancing support-control unit with any known means including wired or wireless connection.

The balancing support system as per the present invention is configured to be operated by a method of operation to assist a rider for balancing the saddle ride-type vehicle. The method comprises the steps as below, not limited to the order in which they are discussed. Receiving information from the plurality of sensors support-control unit. Calculating an estimated steering angle continuously based on information received for the plurality of sensors by the balancing support-control unit. Correspondingly, estimating a corresponding estimated steering torque. Comparing the calculated estimated steering angle with an actual steering angle, which is applied by the rider. Estimating a mean of the actual steering angle over a pre-determined time and comparing with a first pre-determined value and this is done so as to determine vehicle running condition and rider intent. Further, identifying a vehicle running condition based on at least one of the estimated mean (mean value) of the actual steering angle and an instantaneous differential between the actual steering angle and the estimated steering angle. Calculating a balancing actuator angle and a balancing support torque and triggering an actuator unit coupled to a torque enhancer unit in order to drive a steering shaft of the motor vehicle to create balance.

In one embodiment, the triggering the actuator unit coupled to a torque enhancer unit in order to deliver the balancing support torque to drive a steering shaft of the motor vehicle.

In one embodiment, calculating the balancing actuator angle comprises calculating a mean of a difference between the actual steering angle (over a pre-determined time) and the estimated steering angle, and adding to the estimated steering angle.

In one embodiment, the aforementioned mean of the difference between the actual steering angle over a pre-determined time is multiplied with a steering tuning parameter before adding to the estimated steering angle.

In one embodiment, the identifying the vehicle running conditions includes determining a running condition of the motor vehicle from one of the mean of the actual steering angle compared with a first pre-determined value and a differential between the actual steering angle and the estimated steering torque compared to zero. The first pre-determined is preferably zero.

The method pre-dominantly considers the estimated steering angle and selectively uses the estimated steering torque and the actual steering torque to determine a vehicle riding condition and thereby determining an angle and torque to be applied by the actuator unit.

The present invention addressed the problem of low-stability by using a compact system, which can be implemented even in conventional vehicles designs.

The present invention retains a trail of the motor vehicle. The present invention enables balancing even with positive trail, which is desired for stability and maneuverability at higher speeds.

The motor vehicle may experience certain level of variations due to subtle variations or change in angular position the steering system even in straight riding condition corresponding to zero torque requirement from the rider. Similarly, the angular position of the steering system may change for the maneuverer over the period of time. Therefore, the steering angle sensor is enabled to sense these variations and provide accurate data to a control system to precisely control the actuator unit. As per an aspect of the present invention this is accomplished by knowing or calibrating the angular position of the actuator unit/steering system corresponding to various dynamic parameters of the motor vehicle.

In one embodiment, the torque sensor is provided in the steering shaft and is used to measure torque applied by the actuator motor to the steering system and to estimate the torque applied by the rider on the steering system.

The present invention provides improved riding experience to experience as well as to novice riders as critical balancing function is taken care by the balancing support system. The riders can comfortably ride in slow moving conditions like heavy traffic etc. The present subject matter is further described with reference to accompanying figures. It should be noted that the description and figures merely illustrate principles of the present subject matter. Various arrangements may be devised that, although not explicitly described or shown herein, encompass the principles of the present subject matter. Moreover, all statements herein reciting principles, aspects, and examples of the present subject matter, as well as specific examples thereof, are intended to encompass equivalents thereof.

The balancing support system may be implemented in any two-wheeled vehicle or a three-wheeled motor vehicle. However, for the purpose of explanation and by no limitation, the balancing support system, and corresponding additional advantages and features are described through the following embodiments. Arrows wherever provided on top right corner of the figure represent direction with respect to motor vehicle. Arrow F represents forward direction, arrow R represents rearward direction, arrow UW represents upward direction and arrow DW represents downward direction.

Figure 1:
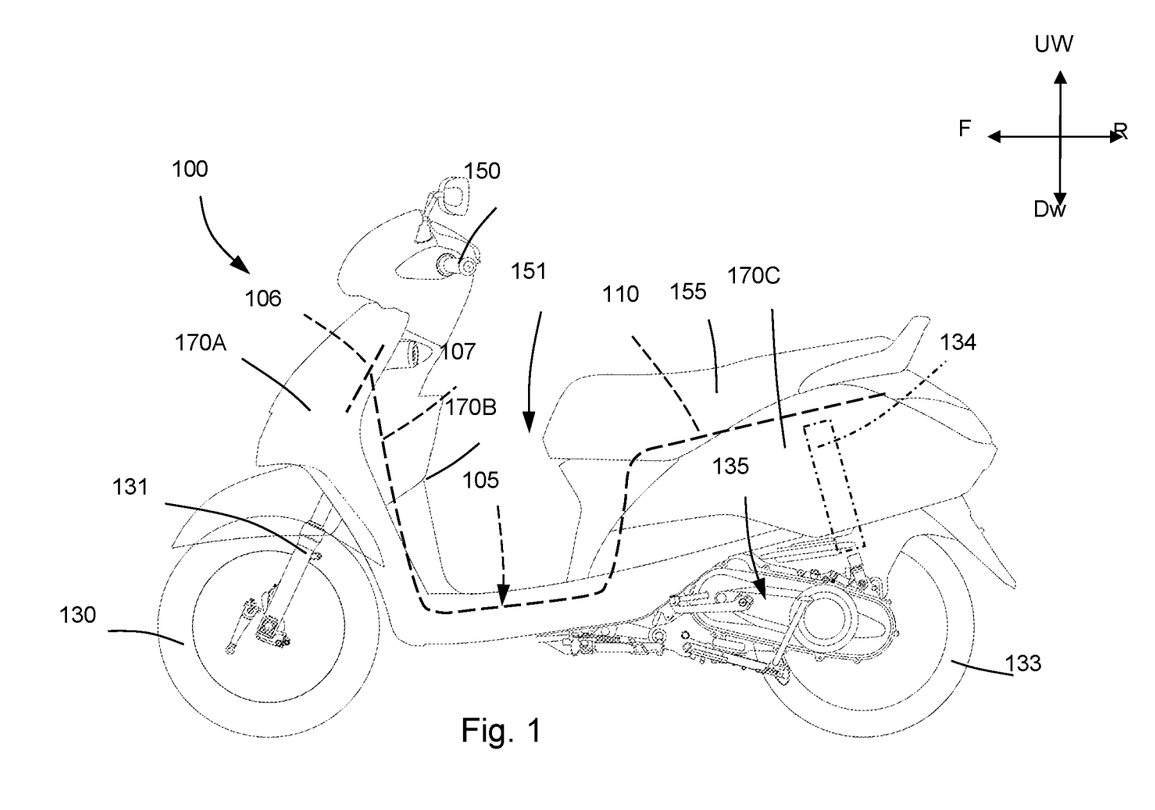
FIG. 1 illustrates a left-side view of an exemplary motor vehicle, in accordance with an embodiment of the present subject matter.

FIG. 1 depicts a left side view of an exemplary motor vehicle 100, in accordance with an embodiment of the present subject matter. The motor vehicle 100 includes a frame assembly 105 (shown schematically) comprising a head tube 106, a main tube 107 extending rearwardly downward from the head tube 106, and one or more rear tubes 110 extending inclinedly rearward from a rear portion of the main tube 107. In the depicted embodiment, the frame member 105 defines a step-through portion 151. In one embodiment, a main tube may be adapted to extend rearward from the head tube 106 and subsequently downward defining a space below the main tube supporting a power unit. A front wheel 130 and a rear wheel 133 are rotatably supported by a front suspension system 131 and the rear suspension system 134, respectively. In one embodiment, the rear wheel 133 may be additionally supported by a swingarm.

In the present embodiment, a power unit 135 is swingably connected to the frame member 105 and is disposed substantially below a seat assembly 155 and rearward to the step-through portion 151. The power unit 135 includes a transmission system (not shown) for transferring power to the rear wheel 133. The transmission system may include a continuously variable transmission, an automatic manual transmission, a belt/chain drive. In one embodiment, the power unit 135 is an internal combustion engine. In another embodiment, the power unit 135 is an electric prime mover. In one another implementation, the power unit is fixedly mounted to the frame assembly 105 of the motor vehicle 100.

Further, the front wheel 130 is pivotally supported by the frame assembly 105 and a handle bar assembly 150 is functionally connected to the front wheel 130 for maneuvering and steering the vehicle 100. The handle bar assembly 150 may support an instrument cluster, vehicle controls including throttle, clutch, or electrical switches. Further, a seat assembly 155 is supported by the frame assembly 105 and the rider can operate the vehicle 100 in a seated position on the seat assembly 155. Moreover, in the depicted embodiment, the vehicle 100 includes the step-through portion 151 formed between the handle bar assembly 150 and the seat assembly 155.

Figure 2:
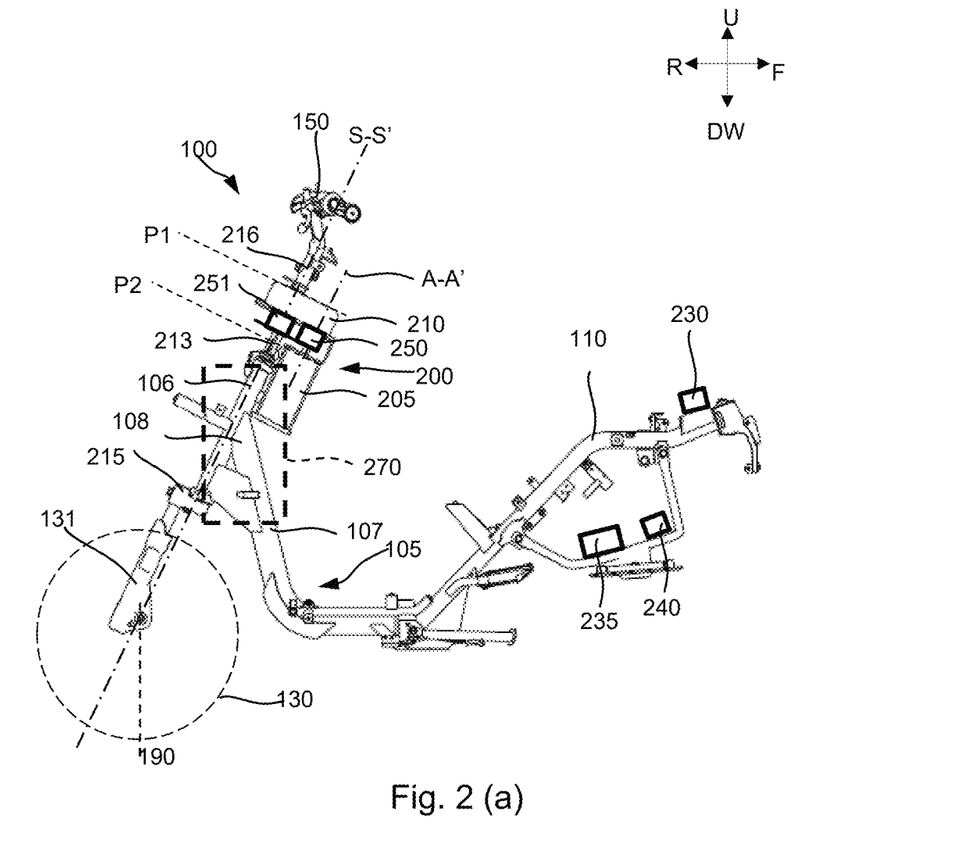

The vehicle 100 is provided with plurality of panels 170A, 170B, 170C mounted to the frame assembly 105 and covering the frame assembly 105 and/or parts of the vehicle 100. The plurality of panels includes a front panel 170A and a leg-shield 170B covering a head tube 106 of the frame assembly 105 in forward and rearward direction, respectively. Further, a rear panel assembly 170C is disposed substantially below the seat assembly 155. The rear panel assembly 170C substantially covers a utility box (not shown) disposed below the seat assembly 155 and also, covering at least a portion of the power unit 135. The motor vehicle 100 is provided with a balancing support system 200 (shown in FIG. 2 (*a*)), which is discussed in following description.

FIG. 2 illustrates a schematic side view of a balancing support system 200 supported on a frame assembly 105 of a motor vehicle, in accordance with an embodiment of the present subject matter. A steering shaft 213 is rotatably journaled about the head tube 106. The steering shaft 213 comprises a lower end. A lower bridge 215 is connected to the lower end of the steering shaft 213. The lower bridge 215 is configured to support the front suspension system 131. The front suspension system 131 rotatably supports the front wheel 131. The steering shaft 213 is rotatable about a steering axis S-S'. In the depicted embodiment, the motor vehicle 100 comprises a positive trail, as the steering axis S-S' extends ahead of a point of contact 190 of the front wheel 130 to the road surface. Further, the present invention enables retaining the trail, say a positive trail, and does not require any change in trail during operation of the motor vehicle.

The balancing support system 200 of the motor vehicle 100 comprises of an actuator unit 205 and a torque enhancer unit 210, which is functionally connected to the actuator unit 205. The actuator unit 205 is fixedly mounted to the frame assembly 105. In one embodiment, an extension member (not shown) is fixed to the frame assembly 105 and the actuator unit 205 is supported on the extension member. In another embodiment, the actuator unit 205 is securely mounted to a first portion 270 of the frame assembly 105. The first portion 270 is a portion which comprises of the head tube 106 and a front portion 108 of the main tube. In the depicted embodiment, the actuator unit 205 is fixed to rear facing side of the head tube 106. As per an embodiment, the steering axis S-S' is parallel to the actuator axis A-A'. Further, in the depicted illustration the actuator unit 205 is disposed to extend beyond the head tube 106 in upward UW-downward DW direction and the torque enhancer unit 210 is disposed above the actuator unit 205 and above the head tube 106. The torque enhancer unit 210 is configured to provide driving force from the actuator unit to the steering shaft 213. Thus, as per the present invention, an existing configuration of head tube 106 is retained in the motor vehicle, without the need for changing a front portion (say head tube portion) of the frame assembly 105. The torque enhancer unit 210 and the actuator unit 205 are disposed substantially at a laterally central region of the motor vehicle 100. Thus, the torque enhancer unit 210 and the actuator unit 205 disposed at the laterally central region are mounted in a balanced manner on the motor vehicle 100 without shifting center of gravity of the motor vehicle 100 towards any sides. Also, the forward configuration of the torque enhancer unit as well as the actuator unit enables mass centralization closer to the steering axis thereby minimizing change in steering inertia and enabling enhanced handling stability of the vehicle.

In one embodiment, along with the actuator unit 205, plurality of sensors and a balancing support-control unit 235 are secured to the frame assembly 105. In one embodiment, a steering angle sensor 250 forming part of the plurality of sensors is mounted between an actuator unit shaft (not shown) of the actuator unit 205 and the torque enhancer unit 210. In one embodiment, the steering angle sensor 250 is disposed substantially between a first plane P1 and a second plane P2. The first plane P1 is passing along an upper surface of the torque enhancer unit 210 and the second plane P2 is passing along an upper surface of the actuator unit 205. Thus, the steering angle sensor 250, which is a critical sensor, is disposed securely between the two planes P1 & P2 and in proximity to the torque enhancer unit 210 thereby achieving a compact and stable layout. In one embodiment, the steering angle sensor 250 is functionally coupled to the torque enhancer unit 210. The steering angle sensor 250 is compactly accommodated on the motor vehicle without disturbing the function of the steering shaft 213, the actuator unit 205 and the handlebar assembly 150. The steering angle sensor 250 is configured to provide data/information related to steering angle of the steering shaft 213. A torque sensor 251 of the plurality of sensors is mounted in the steering shaft 213 to measure the torque applied by the rider to the steering system. A top portion of the steering shaft 213 is functionally connected to a handlebar assembly 150 through a connecting means 216. In the depicted embodiment, a balancing support-control unit 235 is supported by the rear tubes 110. The balancing support-control unit 235 is communicatively coupled to the actuator unit 205 in order to activate/deactivate or control operation of the actuator unit 205. The balancing support-control unit 235 estimates an estimated steering torque T based on inputs received from the plurality of sensors. Then determines a balancing support torque $T_B$ and triggers the actuator unit 205 with input corresponding to the balancing support torque $T_B$ thereby assisting the rider in balancing the motor vehicle. The plurality of sensors includes a speed sensor (not shown), a global positioning system (GPS) unit 230, an inertia measurement unit 240 supported by the frame assembly 105. As per an embodiment, the plurality of sensors 230, 240 are disposed at the posterior region of the vehicle and substantially in close vicinity of the balancing support control unit 235 to enable a compact and secure layout of the vehicle. The plurality of sensors is communicatively coupled to the balancing support-control unit 235 in order to provide various dynamic operating conditions of the motor vehicle 100. The handlebar assembly 150 and the actuator unit 205 are capable of providing input parallelly to the steering shaft 213 to maneuver the motor vehicle 100.

The balancing support system 200 is activated at predetermined conditions of the motor vehicle 100. For example, when the rider is operating the motor vehicle 100 at low-speeds (say at a speed less than 5 kilometers per hour, as per one embodiment), the balancing support system 200 is activated. In order to balance the motor vehicle 100 at such low speeds, the rider usually provides a balancing input to the motor vehicle 100 by operating the handlebar assembly 150 of the steering system. However, the input provided by the rider may not be sufficient, or may not be in the right direction or with the required rate. The balancing support system 200 gets actuated and it applies a partial or complete balancing torque to the steering shaft 213. The steering shaft 213 receives input from the handlebar assembly 150 and from the actuator unit 205. In addition to balancing assist, the actuator unit 205 provides a steering/torque assist. The balancing support-control unit 235 is configured to estimate a torque to be applied using data from one or more sensors of the plurality of the sensors that include the inertia measurement unit 240, a speed sensor (not shown), a global positioning sensor unit 230 etc. The balancing support system 200 predominantly uses data from the steering angle sensor 250 and as per an additional embodiment may consider data from the torque sensor 251.

As the rider has to actively control the steering input to balance the motor vehicle 100 at low-speed, the balancing torque from the actuator unit 205 improves the stability and improves the riding experience. A small motor can be configured to act as the actuator unit 205. Torque output from the actuator unit 205 is enhanced through a desired gear ratio of the torque enhancer unit in order to provide additional torque required for balancing the motor vehicle 100. Thus, need for a large actuator unit with higher torque is avoided. Further, a small capacity is sufficient to operate the actuator unit 205 thereby avoiding a large capacity battery power. The small capacity battery can be compactly accommodated in the motor vehicle without the need for any change in layout. The present invention provides additional weight advantage due to compact configuration and cost advantage due to retainment of conventional design language of the motor vehicle & use of a single and small motor. Further, in one implementation, the balancing support system 200 (components disposed near the head tube 106) are substantially enclosed by the front cover 170A and the leg shield 170B.

FIG. 2 (*b*) illustrates a top view of a torque enhancer unit 210, in accordance with an embodiment of the present subject matter. FIG. 2 (*c*) illustrates an exploded perspective view of the torque enhancer unit 210, in accordance with an embodiment of the present subject matter as illustrated in FIG. 2 (*b*). The torque enhancer unit 210 comprises a housing formed by a first casing 211 and a second casing 212. The first casing 211 and the second casing 212 which enclose plurality of gears. A drive gear 255 is supported on a drive shaft 245, which is rotatably supported. The actuator unit 205 is coupled to the drive gear 255/drive shaft 245. The drive gear 255 is meshed with a driven gear 260 and the driven gear 260 is supported on a driven shaft 246. The driven gear 260 is coupled to the steering shaft 213. In one implementation, one end of the driven shaft 246 is coupled to the steering shaft 213 and other end of the driven shaft 246 is coupled to the handle bar assembly 150. A gear ratio between the drive gear 255 and the driven gear 260 is configured to provide actuator unit torque to the steering shaft 213. The drive gear 255 and the driven gear 260 are having their axes of rotations parallel to each other. Thus, the torque enhancer unit comprises the drive gear 255 and the driven gear 260. The drive gear 255 is functionally coupled (meshed) to the actuator unit 205 and the driven gear 260 functionally coupled (meshed) to steering shaft 213. The drive gear 255 and the driven gear 260 are configured with a gear ratio to provide torque enhancement to drive the steering shaft 213. In a preferred embodiment, the drive gear 255 is smaller (a smaller number of teeth) when compared with the driven gear 260.

Further, the drive gear 255 is provided with a tandem gear 257. In one embodiment, the drive gear 255 and the tandem gear 257 are attached to the same drive shaft 245. The tandem gear 257 is meshed with a sensor gear 265, which is configured to functionally interface with a steering angle sensor and/or a steering torque sensor to provide steering angle information of at least one of the actuator unit 205 and the steering shaft 213. The sensor gear 265 is rotatably supported on a sensor shaft 247. In one embodiment, the steering angle sensor 250 is functionally coupled the tandem gear 257 through the sensor gear 265 and is configured to provide steering angle information. The shafts 245, 246, 247 are rotatably supported in the torque enhancer 210 through plurality of bearings 271, 272, 273, 274, 275, 276. In one embodiment, the first casing 211 and the second casing 212 are provided with slots C1, C2, C3 to support the bearing 271, 272, 273, 274, 275, 276. The torque enhancer unit 210 has a small width in upward-downward (UW-DW) direction as well as a compact height in the steering axis direction. It substantially takes the width of gears, bearings and the casing, which is substantially small as shown in side view in FIG. 2 (*a*).

In one embodiment, the balancing support-control unit 235 receives input from the inertia measurement unit (IMU) 240, a global positioning sensor 230 or a speed sensor (not shown), the steering angle sensor 250 and as per an additional embodiment may consider input received from the steering torque sensor 251. The steering torque sensor 251 provides data to the balancing support-control unit 235 with respect to the force or torque with which a rider exerts force to steer the motor vehicle through the handlebar 217. The steering angle sensor 250 provides data to the balancing support-control unit 235 regarding an angle of rotation of the steering shaft 213, which is analogous to angle of rotation of the handlebar assembly 150. The inertia measurement unit 240 measures roll, yaw and pitch angles, and corresponding rate of change. The global positioning sensor 230 or the speed sensor provides data corresponding to speed of motor vehicle and also signals relating to instantaneous position of the motor vehicle 100. The balancing support-control unit 235 upon receiving data from one or more of the sensors, calculates the input to be provided to the actuator unit 205. Accordingly, the actuator unit shaft (not shown) of the actuator unit 205 is rotated whereby the drive gear 255 rotates the driven gear 260. The driven gear, which is engaged with the steering shaft 213 provides the required torque and angle of rotation thereto thereby achieving stability and balance of the vehicle.

Based on the signals generated by the aforementioned sensors, which provide information/data regarding various dynamic parameters of the motor vehicle, the balancing support-control unit 235 continuously calculates an estimated steering torque T, which is required for balancing the motor vehicle 100. In one embodiment, the data from the steering angle sensor 250, with reference steering condition, is sufficient to estimate the estimated steering torque T (may consider other non-steering related data). The estimated steering torque T is estimated by any known mathematical models or pre-defined balancing tables by considering steering angle, roll angle and roll rate.

Figure 3:
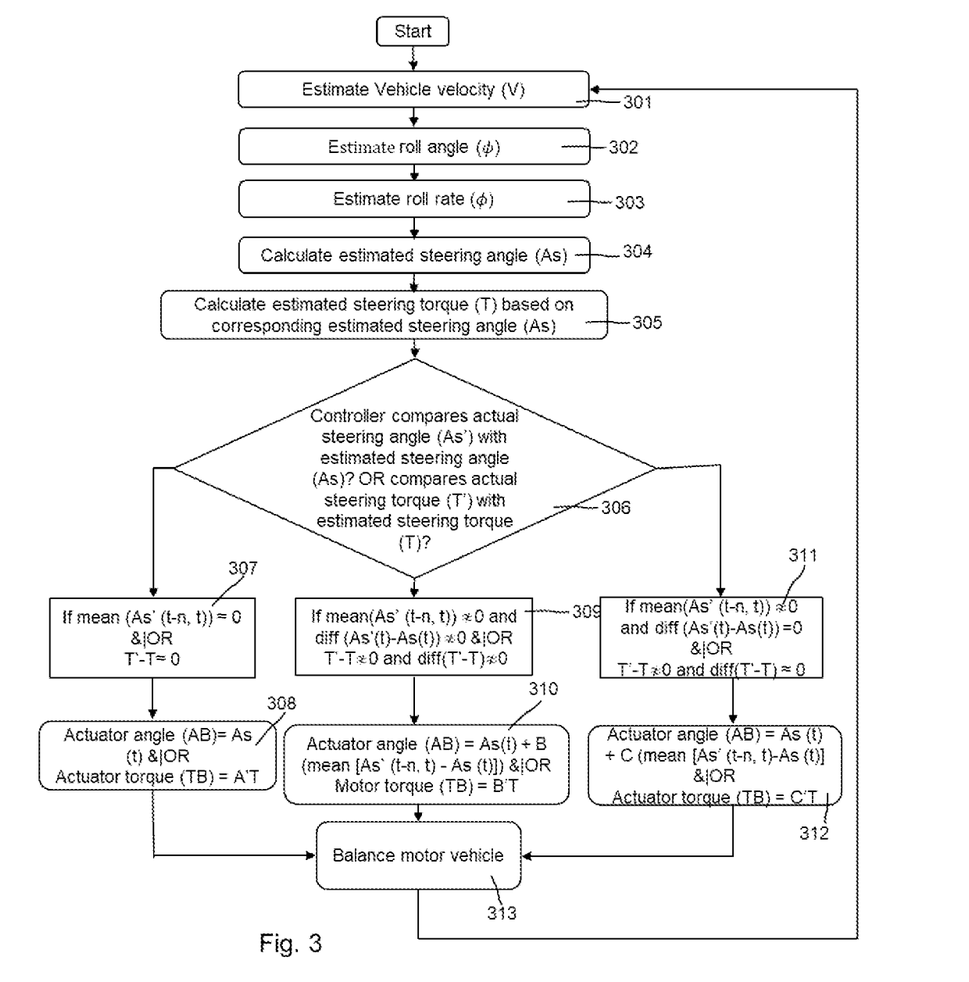
FIG. 3 depicts a flow chart illustrating a method of operation of a balancing support system, in accordance with an embodiment of the present subject matter.

FIG. 3 illustrates a method of functioning of a balancing support system 200 comprising a balancing support-control unit 235, in accordance with an embodiment of the present invention, in the form of a flowchart 300. A step 301, the balancing support-control unit 235 receives data from GPS unit 230 or vehicle speed sensor and calculates a vehicle speed/velocity V. At step 302, the balancing support-control unit 235 receives data from IMU 240 and calculates roll angle ($\phi$). At step 303, the balancing support-control unit 235 estimates a roll rate ($\dot{\phi}$) of the motor vehicle. At step 304, the balancing support-control unit 235 calculates an estimated steering angle $A_s$ based on balancing support maps or a pre-defined formula from one or more dynamic parameters from the sensors. At step 305, the balancing support-control unit 235 through a balancing support system 200 applies a controlled torque/estimated steering torque T to achieve an estimated steering angle (target) $A_s$ of the steering system based on reduction gear ratio of the torque enhancer unit 210.

At step 306, the balancing support-control unit 235 compares the estimated steering angle $A_s$ and/or the estimated steering torque T with an actual steering angle $A_s'$ and an actual steering torque T', respectively. The actual steering angle $A_s'$ is the input from the rider. If the estimated steering angle $A_s$ is not achieved by the rider, then the balancing support-control unit 235 actuates the actuator unit 205 to achieve the desired angle and torque for balancing. The balancing support-control unit 235 compares and checks if the actual steering angle $A_s'$ being performed by the rider is equal to the estimated steering angle $A_s$, estimated by the balancing support-control unit 235. If rider is performing the steering in the required direction, then the actuator unit 205 supports the steering operation. In one embodiment, the balancing support-control unit 235 receives steering information from current values and the actuator unit 205 is controlled by varying current.

For example, depending on the various dynamic parameters of the motor vehicle 100 i.e. velocity, roll angle, roll rate etc., the steering system is to be rotated by 12 degrees towards left or in anti-clock wise direction as viewed from a top along steering axis S-S' for balancing. The balancing support system 200 checks the actual steering angle $A_s'$ and the estimated steering angle $A_s$. Say, the rider has rotated only by an angle 6 degrees. The steering angle for balancing is not yet achieved. The balancing support-control unit 235 actuates the actuator unit 205 to rotate the steering system for the additional 6 degrees for balancing the motor vehicle 100.

The balancing support-control unit 235 typically encounters at least three different riding scenarios subsequent to step 306, while comparing estimated steering angle $A_s$ with the actual steering angle $A_s'$ or the estimated steering torque T with actual steering torque T'. In a first condition, where the rider is not maneuvering and the motor vehicle 100 is in a straight running condition, the estimated steering angle $A_s$ is approximately zero (say considering mean over a pre-determined time [$t_{-n}$ to t secs]) and a difference between the actual steering torque T' and the estimated steering torque T is also approximately zero. In other words, the estimated steering angle $A_s$ is considered for a pre-determined time and is compared to a first pre-determined value, which is 0 in one implementation. Therefore, at step 307, the balancing support-control unit 235 identifies the straight running condition. At step 308, the balancing support-control unit 235 uses a multiplication factor viz. a torque tuning parameter A to arrive at the balancing support torque $T_B$ and a balancing steering angle $A_B$ (interchangeably referred to as actuator angle/motor angle) to achieve balancing of motor vehicle 100 at step 313.

In second condition, at step 309, where the rider transiently maneuvers the vehicle, say for example during traffic conditions, or when he/she tries to suddenly evade a pothole or a road disturbance, the actual steering torque T' at that instant will not be the same as the estimated steering torque T calculated by the balancing support-control unit 235. Thus, due to the transient nature of the movement, the mean value of the actual steering value As' over a pre-determined period (t-n to t secs) will not be zero. A differential between the actual steering angle $A_s'$ and the estimated steering angle $A_s$ in not zero. Similarly, a differential between the actual steering torque T' and the estimated steering torque T is not zero i.e. differential of (T'-T)≠0.

In such conditions, at step 310, the balancing support-control unit 325 considers a mean of a difference between the actual steering angle $A_s'$ over a pre-determined and the estimated steering angle $A_s$. This value would be negative if the rider is steering in the required direction and the value will be positive if the rider is steering in opposite direction. The mean of the difference is multiplied with an angle tuning parameter B and then added to the estimated steering angle $A_s$. Accordingly, this sum i.e. the balancing steering angle $A_B = (A_s(t) + B \text{ (mean } [A_s'(t-n, t) - A_s(t)]))$ is applied to the actuator unit 205 and triggers the actuator unit to apply a balancing support torque $T_B$ (multiplication of values of a torque tuning parameter B' & T, wherein B' is a torque tuning parameter).

The value of the tuning parameters B and B' depends on instantaneous values of roll angle and roll rate and varies between 0 and 1 depending on the riding conditions. For example, after riding steadily for some distance with the assistance of the balancing support system 200, when the rider maneuvers transiently during a lane change or for evading a pothole, the value of B' chosen will be reduced close to zero, so as to allow the rider to apply the required torque for maneuvering. The reduction in value of the torque tuning parameter B' to close to zero is made gradually so that the rider does not experience sudden discomfort of applying additional torque. However, after the transient maneuver when the rider continues to ride straight, the value of B' is gradually increased close to 1. Thus, smooth transition is made from providing assistance at straight running conditions to providing required assistance during transient maneuver and back to assisting during straight running. Inclusion of the torque tuning parameter B' ensures that the rider has control over the vehicle while also ensuring that the vehicle does not lose balance. It is important that the rider is made to feel that he is in control of the vehicle even while the vehicle is still being assisted by the rider assist system for balancing the vehicle because the rider may tend to over steer or apply additional unnecessary torque if the rider assist system completely takes over the steering of the vehicle.

In another condition, at step 311, where the rider is steadily cornering, that the mean of an actual steering angle As' over a pre-determined time is not equal to zero. The actual steering torque T' is not equal to estimated steering torque T, as the balancing support-control unit 235 determines the estimated assist torque T based on roll angle of the vehicle. Due to the nature of the movement, the mean value of the actual steering value $A_s'$ over a pre-determined period (t–n to t secs) will not be zero. A differential between the actual steering angle As' and the estimated steering angle $A_s$ in not zero. Similarly, a differential between the actual steering torque T' and the estimated steering torque T may be zero i.e. differential of (T'–T)≈0 due to steady cornering.

In such conditions, at step 312, the balancing support-control unit 235 considers a mean of a difference between the actual steering angle $A_s'$ over a pre-determined time and the estimated steering angle $A_s$ i.e. (mean ($A_s'$ (t–n, t), $A_s$ (t)). This value would be negative if the rider is steering in the required direction and the value will be positive if the rider is steering in opposite direction. The calculated mean of the difference is multiplied with an angle tuning parameter C and then added to the estimated steering angle $A_s$. Accordingly, based on this sum i.e. ($A_s$(t)+C (mean [$A_s'$ (t–n, t)–$A_s$ (t)]) is applied to the actuator unit 205 and thereby triggering the actuator unit 205 to apply a balancing steering angle $A_B$ and the balancing support torque $T_B$ (multiplication of values of C' & T, wherein C' is a torque tuning parameter). The balancing support-control unit 235 triggers the actuator unit 205 to apply a balancing support torque $T_B$ (a torque tuning factor C' multiplied by T) and an actuator angle/motor angle. The balancing support-control unit 235 is configured to select C' as the correction coefficient or tuning parameter required to be applied to the estimated assist torque when the vehicle is being subjected to steady cornering. The value of C and C' varies between 0 and 1. For example, value of C' is chosen to be zero when the rider begins cornering so that the rider is conscious of the torque that he would be applying. Value of C' is steadily increased close to 1 when the rider continues the cornering so that final assist torque becomes equal to the estimated assist steering torque T. Thus, in either of the three conditions, the motor vehicle 100, at step 313 is balanced by the balancing support system 200. Further, the balancing support system 200 loops back and again checks the dynamic parameter of the motor vehicle 100. Hence, the system continuously checks the dynamic parameter of the motor vehicle and provides balance. Once the motor vehicle 100 is balanced, the balancing support system 200 enables the rider to perform the desired steering operation and instantaneously checks the dynamic parameters of the motor vehicle 100 to check for stability.

While certain features of the claimed subject matter have been illustrated and described herein, many modifications, substitutions, changes, and equivalents will now occur to those skilled in the art. It is, therefore, to be understood that the appended claims are intended to cover all such modifications and changes that fall within the true spirit of the claimed subject matter.

LIST OF REFERENCE SIGNS 100 vehicle
105 frame assembly
106 head tube
107 main tube
108 front portion
110 rear frame(s)
130 front wheel
131 front suspension system
133 rear wheel
134 rear suspension system
150 handlebar assembly
151 step-through portion
155 seat assembly
170A front panel
170B leg shield
170C rear panel assembly
190 point of contact
200 balancing support system
205 actuator unit
210 torque enhancing unit
211 first casing
212 second casing
213 steering shaft
215 lower bridge
216 connecting tube
230 global positioning unit
235 balancing support-control unit
240 inertia monitoring unit
245 drive shaft
246 driven shaft
247 sensor shaft
250 steering angle sensor
251 torque sensor
255 drive gear
257 tandem gear
260 driven gear
265 sensor gear
270 first portion (frame assembly)
271, 272, 273, 274, 275, 276 bearings
A'/B'/C' torque tuning parameter
B/C angle tuning parameter
A-A' actuator axis
$A_s$ estimated steering angle
$A_s'$ actual steering angle
$A_B$ balancing steering angle
C1, C2, C3 slots
P1 first plane
P2 second plane
S-S' steering axis
T estimated balancing torque
T' actual steering torque
$T_B$ balancing support torque
V velocity
Φroll angle/roll rate

We claim:

1. A balancing support system for a saddle ride-type motor vehicle that comprises a frame assembly comprising a head tube in a front portion of the frame assembly, the balancing support system configured to assist a rider by balancing the motor vehicle and comprising:
   a steering shaft rotatably journaled about the head tube;
   a plurality of sensors that senses various dynamic parameters of the motor vehicle and comprises a steering angle sensor;
   an actuator unit secured to a first portion of the frame assembly;
   a balancing support-control unit that calculates, based on inputs received from the plurality of sensors, an estimated steering angle, compares the estimated steering angle with an actual steering angle, and triggers the actuator unit; and a torque enhancer unit that is disposed above the head tube and is configured to provide a driving force from the actuator unit to the steering shaft.

2. The balancing support system as claimed in claim 1, wherein the torque enhancer unit is disposed above the head tube, and at least partially overlaps with the head tube when viewed along a steering axis.

3. The balancing support system as claimed in claim 1, wherein
the torque enhancer unit comprises a drive gear and a driven gear, the drive gear being functionally coupled to the actuator unit, and the driven gear being functionally coupled to the steering shaft, and
the drive gear and the driven gear are configured with a gear ratio to provide torque enhancement to drive the steering shaft with input corresponding to a balancing support torque.

4. The balancing support system as claimed in claim 1, wherein
the steering angle sensor is functionally coupled to the torque enhancer unit,
the torque enhancer unit comprises a tandem gear functionally coupled to the drive gear to rotate therewith, and
the steering angle sensor is functionally coupled to the tandem gear and configured to provide steering angle information.

5. The balancing support system as claimed in claim 1, wherein the steering angle sensor is disposed substantially between a first plane passing along an upper surface of the torque enhancer unit and a second plane passing along an upper surface of the actuator unit.

6. The balancing support system as claimed in claim 1, wherein the actuator unit and the torque enhancer unit are disposed substantially within a laterally central region of the motor vehicle.

7. The balancing support system as claimed in claim 1, wherein
the first portion of the frame assembly is formed by the head tube and a front portion of a main tube, and
the main tube extends rearwardly from the head tube.

8. The balancing support system as claimed in claim 1, wherein the actuator unit is coupled to a rearward facing side of the head tube, and is disposed to extend beyond the head tube in an upward direction.

9. The balancing support system as claimed in claim 1, wherein
the plurality of sensors comprises a velocity sensor, a global positioning unit, a steering torque sensor and an inertia measuring unit, and
the plurality of sensors is supported by the frame assembly of the motor vehicle.

10. The balancing support system as claimed in claim 1, wherein the plurality of sensors comprises one or more sensors disposed in a posterior portion of the motor vehicle.

11. The balancing support system as claimed in claim 1, wherein
the motor vehicle comprises a handlebar assembly functionally coupled to the steering shaft through the torque enhancer unit, and
the handlebar assembly and the actuator unit are capable of providing input parallelly to the steering shaft.

12. A method of operation of a balancing support system to assist a rider by balancing a saddle ride-type motor vehicle, the method comprising the steps of:
receiving information from a plurality of sensors corresponding to dynamic conditions of the motor vehicle;
calculating, based on information received for the plurality of sensors, an estimated steering angle and an estimated steering torque continuously;
comparing the estimated steering angle with an actual steering angle applied by the rider;
estimating a mean of the actual steering angle over a pre-determined time and comparing the estimated mean with a first pre-determined value;
identifying a vehicle running condition based on at least one of the estimated mean of the actual steering angle, and an instantaneous differential between the actual steering angle and the estimated steering angle;
calculating a balancing actuator angle and a corresponding balancing support torque; and
triggering an actuator unit coupled to a torque enhancer unit in order to deliver the balancing support torque to drive a steering shaft of the motor vehicle.

13. The method as claimed in claim 12, wherein
the identifying the vehicle running condition includes determining a straight running condition of the motor vehicle when one of the mean of the actual steering angle is equal to the first pre-determined value and a differential between the actual steering angle and the estimated steering torque is equal to zero, and
the first pre-determined value is zero.

14. The method as claimed in claim 12, wherein the identifying the vehicle running condition includes determining a transient running condition when the mean of the actual steering angle is not equal to the first pre-determined value, and the estimated steering torque is not equal to the difference between actual steering angle and the estimated steering angle is not equal to zero.

15. The method as claimed in claim 12, wherein the identifying the vehicle running condition includes determining a steady cornering condition when the mean of the actual steering angle is not equal to the first pre-determined value, and the difference between the actual steering angle and the estimated steering torque is equal to zero.

16. The method as claimed in claim 12, wherein the calculating the balancing actuator angle comprises calculating a mean of a difference between the actual steering angle over a pre-determined time and the estimated steering angle, and adding the mean of the difference to the estimated steering angle.

17. The method as claimed in claim 16, wherein the mean of the difference is multiplied with a steering tuning parameter before being added to the estimated steering angle.

18. The method as claimed in claim 17, wherein
the steering tuning parameter has value between 0 and 1 (both inclusive), and
the estimated steering angle is estimated from any one of a pre-determined steering maps, a pre-determined steering table and a pre-determined calibrated value.

* * * * *